United States Patent [19]

Hebnes

[11] Patent Number: 4,949,448
[45] Date of Patent: Aug. 21, 1990

[54] WHEEL MOUNTING TOOL

[75] Inventor: Allan M. Hebnes, Hooper, Colo.

[73] Assignee: David, Steven, Marjorie Mitchell, Brighton, Colo.

[21] Appl. No.: 421,821

[22] Filed: Oct. 16, 1989

[51] Int. Cl.$^5$ ............................................. B25B 27/14
[52] U.S. Cl. ..................................................... 29/273
[58] Field of Search ........................ 29/273, 271, 264; 7/100; 157/1.1, 1.11

[56] References Cited

U.S. PATENT DOCUMENTS

| | | |
|---|---|---|
| 1,494,269 | 5/1924 | Meyers . |
| 1,735,124 | 11/1950 | Miller . |
| 1,975,773 | 10/1934 | Davis . |
| 2,499,758 | 3/1950 | Keyfetz ............... 29/273 |
| 2,555,698 | 6/1951 | Masheck ............... 29/273 |
| 3,319,327 | 5/1967 | Dombeck . |
| 3,348,294 | 10/1967 | Gerardi . |
| 3,364,558 | 1/1968 | Freet . |
| 3,389,453 | 6/1968 | Tartar . |

FOREIGN PATENT DOCUMENTS

| | | | |
|---|---|---|---|
| 141319 | 5/1951 | Australia | 29/273 |
| 454707 | 2/1949 | Canada | 29/273 |
| 47296 | 5/1933 | Denmark | 29/273 |
| 681492 | 2/1930 | France | 29/273 |
| 686360 | 4/1930 | France | 29/273 |

Primary Examiner—Robert C. Watson
Attorney, Agent, or Firm—Stephen A. Gratton

[57] ABSTRACT

A wheel mounting tool for mounting a wheel having a plurality of mounting holes to a hub having a plurality of corresponding externally threaded mounting studs. The tool includes a socket portion with an internal thread for engaging a threaded stud of the hub, and an offset elongated handle portion pivotally attached to the socket portion. In use the tool can be threaded to a mounting stud of the hub, placed through a mounting hole of the wheel, and pivoted about the stud to lift and force the wheel onto the hub with all of the mounting holes of the wheel in alignment with all of the mounting studs of the hub.

2 Claims, 1 Drawing Sheet

U.S. Patent
Aug. 21, 1990
4,949,448
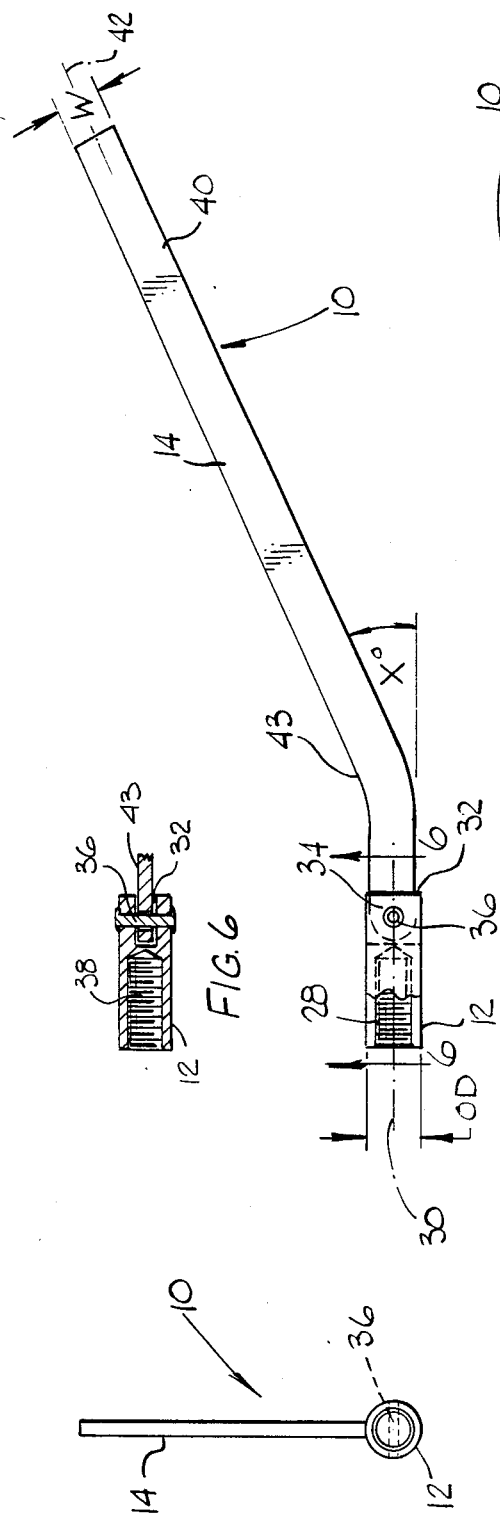

WHEEL MOUNTING TOOL

1. FIELD OF THE INVENTION

This invention relates to tools and more particularly to a hand tool for lifting and mounting a wheel to a hub of a vehicle.

2. BACKGROUND OF THE INVENTION

Hand tools for mounting a wheel to a hub of a vehicle are well known in the prior art. Such tools may be used, for example, by motorists having to change a flat tire on an automobile.

In general, automotive wheel hubs are formed with a circle of threaded studs. The tire wheels are formed with a corresponding circle of inwardly beveled holes. For mounting a wheel to a hub, the beveled holes of the wheel must be placed onto the threaded studs of the hub. Tapered nuts can then threaded onto the studs through the beveled holes in the wheel to align and secure the wheel to the hub.

Additionally, for mounting the wheel and tire to the hub, the vehicle must necessarily be elevated enough to allow the wheel and inflated tire to be placed onto the hub without interference with the ground. This requires the motorist to lift the wheel and tire onto the hub and align the holes on the wheel with the studs of the hub while supporting the full weight of the wheel and tire. This operation requires a considerable amount of strength and is often difficult for female, disabled, or elderly motorists.

A variety of prior tools have been heretofore disclosed as an aid in mounting a tire and wheel to a hub. U.S. Pat. Nos. 1,494,269; 1,735,124; 3,319,327; 3,348,294; 3,364,558; and 4,489,453 disclose representative prior art wheel mounting tools.

The present invention is directed to a wheel mounting tools with an improved construction that allows a tire and wheel to be easily lifted onto, aligned with, and secured to a hub. The present tool is of a simple and economical construction and can be more easily used by a variety of motorists including elderly and partially disabled people.

SUMMARY OF THE INVENTION

A wheel mounting tool for mounting and aligning a wheel having a plurality of mounting holes to a corresponding hub having a plurality of externally threaded mounting studs. The tool includes a socket portion with an internal thread for engaging the threaded stud of the hub and an elongated offset handle pivotally attached to the socket portion.

In use the socket portion of the tool may be threaded to an uppermost mounting stud of the hub of an elevated vehicle, with the offset handle pivoted downward. The handle is then placed through an uppermost mounting hole of the wheel. The offset handle can then be pivoted upward about the stud and onto the hub with the mounting studs of the hub aligned with the mounting holes of the wheel. While on the hub, the socket portion of the tool supports the weight of the tire and wheel and aligns the mounting holes of the wheel with the mounting studs of the hub. Threaded nuts can then be placed onto the threated studs to secure the wheel to the hub and the tool can be removed.

The tool of the invention performs the functions of lifting and guiding the wheel onto the hub, aligning the mounting holes of the wheel to the threaded studs of the hub and holding the wheel in place and against the hub while mounting nuts are attached. The tool also functions to prevent rotation of the hub during this operation.

Further objects, details, and advantages of the invention will become apparent from the following specification and accompanying drawing.

BRIEF DESCRIPTION OF THE DRAWING

FIG. 1 is a side elevation view of a wheel mounting tool constructed in accordance with the invention;

FIG. 2 is a front elevation view of a wheel mounting tool constructed in accordance with the invention;

FIG. 3 is a side elevation view of a wheel mounting tool constructed in accordance with the invention shown in position for lifting a wheel onto a hub;

FIG. 4 is a side elevation view of a wheel mounting tool constructed in accordance with the invention shown in position with the wheel lifted onto the hub and with the mounting holes of the wheel aligned with the threaded studs of the hub;

FIG. 5 is a cross sectional elevation view taken along section line 5—5 of FIG. 4; and FIG. 6 is a cross sectional elevation view taken along section line 6—6 of FIG. 1.

DETAILED DESCRIPTION OF THE DRAWING

Referring now to the drawing, a wheel mounting tool constructed in accordance with the invention is shown and generally designated as 10. The wheel mounting tool 10 simply stated comprises a cylindrical socket portion 12, and an elongated offset handle portion 14 pivotally attached to the socket portion 12.

The wheel mounting tool 10 is intended for use with an automotive wheel 18 having a tire 20 affixed thereto (FIG. 3). The wheel 18 includes a plurality of mounting holes 22 (FIG. 5) evenly spaced along a bolt circle. The wheel 18 is mountable to a hub 24 having a plurality of externally threaded mounting studs 26 (FIG. 3) as is common in the automotive industry. The mounting studs 26 are located and spaced along a bolt circle which corresponds exactly to the location and spacing of the mounting holes 22 of the wheel 18.

The socket portion 12 of the mounting tool 10 is generally hollow and generally cylindrical in shape and includes an internal counterbored threaded portion 28 that matches the external threads of the mounting studs 26 of the hub 24. A longitudinal center line of the socket portion 12 is denoted by reference numeral 30 (FIG. 1).

The outside diameter (O.D.) of the socket portion 12 of the mounting tool 10 is slightly less than but approximately equal to the diameter (D) (FIG. 5) of the mounting holes 22 of the wheel 18. A mounting hole 22 of the wheel 18 can be thus be passed through the socket portion 12 of the tool 10 without interference.

The socket portion 12 also includes a through slot 32 (FIG. 6) symmetrical about the centerline 30 and sized to receive the radiused mounting end 34 of the flat handle portion 14 of the tool 10. A through hole extends through the socket portion and through the slot 32 generally perpendicular to the centerline 30 of the socket portion 12. A matching through bore extends through the mounting end 34 of the handle portion 14. The handle portion 14 can thus be pivotally attached to the socket portion 12 by a roll pin 36 or the like placed through the matching bores.

Referring again to FIG. 1, the handle portion 14 of the tool is shown. The handle portion 14 of the tool 10 is solid, generally flat and rectangular in cross section. The handle portion 14 includes an elongated handle end 40 centered about a center line 42, a curved middle portion 43, and mounting end 34 which as previously stated contains a through hole for pivotally attaching the handle portion 14 to the socket portion 12 of the tool.

The handle portion 14 is bent or curved at an angle ("x") (FIG. 1) such that the mounting end 34 of the handle portion 14 is angularly offset from the handle end 40 of the handle portion 14. The amount of offset determined by the angle "x" may vary depending on the application. The inventor has found however, that an angle "x" of approximately 25 degrees is generally satisfactory for most applications. Additionally, as with the socket portion 12 of the tool 10, the handle portion 14 is sized with a width "w" (FIG. 1) and therefore that is less than the diameter "D" of a mounting hole 22 of the wheel 18.

Referring now to FIGS. 3, 4, and 5, the operation of the wheel mounting tool 10 is shown. In FIG. 3 a hub 24 of an automobile or the like having a plurality of externally threaded mounting studs 26 is shown. The hub 24 is selected by conventional means such as a hydraulic jack 50 to provide clearance for the tire 20 and wheel 18 from a ground surface 52. The wheel 18 has a plurality of mounting holes 22 that correspond to the spacing and size of the externally threaded mounting studs 26 of the hub 24.

In use the socket portion 12 of the mounting tool 10 is first threaded to an uppermost stud 26 of the hub 24. As shown in FIG. 3 the offset handle portion 14 of the tool 10 is pivoted to orient the handle in a generally downward position. An uppermost mounting hole 22 of the wheel 18 is then placed through the handle portion 14 of the tool 10. During this step the weight of the tire 20 and the wheel 18 is supported by the ground surface 52.

The mounting tool 10 is then pivoted and lifted about the stud 26 as indicated by arrow 54 to lift the wheel 18 and tire 20 off the ground surface 52. At the same time the wheel 18 is slid along the handle portion 14 through the curved portion 43 and onto the hub 24 with all of the mounting holes 22 on the wheel aligned with all of the mounting studs 26 on the hub 24. During this operation the full weight of the wheel 18 and tire 20 are supported by the tool 10. Additionally, the mounting tool 10 prevents the hub 24 from rotating.

The tool 10 and wheel 18 are shown in a final position in FIG. 4. In this position the tool and in particular, socket portion 12, continues to supports the full weight of the wheel 18 and tire 20. Additionally, the tool 10 can be manipulated or pivoted using the curved and offset shape of the handle portion 14 to force the wheel 18 against the hub 24. Moreover, in this position the uppermost mounting hole 22 of the wheel is in engagement with the outside diameter of the socket portion 12 of the tool such that all of the mounting holes 22 of the wheel 24 are centered with all of the threaded studs 26 of the hub. The mounting nuts (not shown) can then be attached to the threaded studs to secure the wheel 18 to the hub 24. Finally, the tool 10 can be unscrewed from the uppermost mounting stud and removed.

As previously stated, during mounting of the wheel 18 to the hub 24, the tool 10 supports the full weight of the tire 20 and the wheel 18. The offset and curved shape of the pivoted handle portion 40 of the tool 10 allows the tool 10 to be lifted and pivoted for hoisting the wheel 18 upon the hub 24. At the same time the wheel can be slid along the handle portion 40 of the tool 10 and forced into and held against the hub 24. Additionally, the outside diameter of the socket portion 12 of the tool 10, engages the uppermost mounting hole 22 of the wheel 18 and centers all of the mounting studs 18 with respect to all of the mounting holes 22. Again during this operation the entire weight of the wheel 18 and tire 20 rests on the socket portion 12 of the tool rather than over the stud threads. This helps prevent the pounding and denting of the threaded studs that would otherwise occur. Moreover, during the entire operation the tool 10 prevents the hub 24 from rotating.

The tool 10 is preferably fabricated from a hard material such as steel or hardened tool steel or the like. Separate socket portions 12 of the tool 10 can be sized and tapped with an internal thread that match different sizes and makes of cars and trucks. Likewise, the handle portion 14 of the tool can be sized and dimensioned according to the type of vehicle and size of wheel with which it is used. The inventor has found that a handle portion 14 having a width "w" of approximately ½" and a length of approximately 11" is suitable for most cars and lightweight trucks. A handle portion 14 having a width "w" of approximately 1" and a length of approximately 28" is suitable for most trucks.

Although the dimensions of the tool can be varied according to its use, it is critical that the internal thread of the socket portion 12 and the external threads of the hub mounting stud 26 be the same. In addition, the outside diameter "OD" of the socket portion 12 and width "w" of the handle portion 14 must be less than but approximately equal to the diameter of a wheel mounting hole 22. Additionally, it is critical that the handle 14 of the tool be formed with a curved middle portion 43 and with the mounting end 34 offset from the handle end 40.

Many changes and modifications in the above described embodiment of the invention can of course be carried out without departing from the scope thereof. Accordingly, that scope is intended to be limited only by the scope of the appended claims:

What is claimed is:

1. A tool for mounting a wheel having a plurality of mounting holes to a hub having a matching plurality of externally threaded mounting studs said tool comprising:

a generally flat handle having an elongated handle portion, a generally curved middle portion, and a socket mounting portion with the handle portion angularly offset from the socket mounting portion and with said handle having a width and a length less than a diameter of a mounting hole of the wheel; and a generally cylindrical shaped socket portion formed with a through slot sized to receive the socket mounting portion of said handle with a roll pin placed through matching holes in said socket and said handle such that said handle is pivotally attached at said socket to said socket mounting portion of said handle and with said socket having an internal thread that matches the external thread of the mounting studs of the hub and having an outside diameter less than but approximately equal to a diameter of a mounting hole of the wheel; whereby said socket may be threaded to an externally threaded stud of the hub, said handle placed through a mounting hole of the wheel, said handle pivoted upward to lift the wheel and the wheel slid along said handle, and along the curved middle portion of said handle and forced onto the hub by the curved middle portion with the mounting holes of the wheel in alignment with the mounting studs of the hub.

2. The tool as claimed in claim 1 and wherein said handle portion of said handle is angularly offset from the socket mounting portion by an angle of approximately 25 degrees.

* * * * *